United States Patent [19]
Shelton et al.

[11] Patent Number: 6,046,709
[45] Date of Patent: Apr. 4, 2000

[54] MULTIPLE DISPLAY SYNCHRONIZATION APPARATUS AND METHOD

[75] Inventors: Gary Shelton; Michael Farmer, both of Huntsville; Dale Kirkland, Madison, all of Ala.

[73] Assignee: Intergraph Corporation, Huntsville, Ala.

[21] Appl. No.: 09/007,615

[22] Filed: Jan. 15, 1998

Related U.S. Application Data

[60] Provisional application No. 60/036,120, Jan. 17, 1997.

[51] Int. Cl.$^7$ ........................................................ G09G 5/00
[52] U.S. Cl. ................................................. 345/1; 345/504
[58] Field of Search ................................. 345/1, 502, 504

[56] References Cited

FOREIGN PATENT DOCUMENTS

| | | |
|---|---|---|
| 0 068 123 A2 | 1/1983 | European Pat. Off. . |
| 0 136 625 A1 | 4/1985 | European Pat. Off. . |
| 0 734 011 A2 | 9/1996 | European Pat. Off. . |
| 38 38 348 A1 | 6/1990 | Germany . |

OTHER PUBLICATIONS

H.P. Katseff, et, al.: "On the Synchronization and Display of Multiple Full–Motion Video Streams," IEEE Conference on Communications Software: Communications for Distributed Applications & Systems, Apr. 18–19, 1991, Chapel Hill, North Carolina Central Research Library, Hitachi, LTD.

Abstract, A Multiprocessor System Utilizing Enhanced DSP's for Image Processing, Hirotada Ueda, et al., Central Research Library, Hitachi, LTD.

K. Suiza, et al., "Emerging Memory Solutions for Graphics Applications," IEICE Transactions on electronics, vol. E78–c, No. 7, Jul. 1995; pp. 773–781.

"GLZ5 Hardware User's Guide," Intergraph Corporation, Nov. 1995.

T. DeFanti, et al., "Overview of the I-Way: Wide Area Visual Supercomputing," International Journal of Supercomputing Applications, Oct. 2, 1996; pp. 1–10.

M.C. Miller, et al., "Multiscale Terrain Tiling for Real Time Rendering," Nov. 1, 1996; pp. 1–10.

"Silicon Graphics United Kingdom," Nov. 1, 1996; pp. 1–4.

"Design Considerations and Applications for Innovate Display Option Using Projector Arrays" Index; Nov. 1, 1996; pp. 1–2.

C. Cruz–Neira, et al., "Surround–Screen Projection–Based Virtual Reality: The Design and Implementation of the CAVE," Nov. 1, 1996; pp. 1–13.

D. Pape, "A Hardware–Independent Virtual Reality Development System," Nov. 1, 1996; pp. 1–5.

*Primary Examiner*—Jeffery Brier
*Attorney, Agent, or Firm*—Bromberg & Sunstein LLP

[57] ABSTRACT

A method of synchronizing, at a system frame display rate, a first set of frames displayed by a first monitor with a second set of frames by a second monitor, utilizes frame production rates of the two sets of frames to set the system frame display rate. More particularly, the first set of frames are produced at a first frame production rate by a first graphics engine, and the second set of frames are produced at a second frame production rate by a second graphics engine. The first frame production rate and second frame production rate first are compared to determine which frame production rate is slower. The system frame display rate then is set to be no greater than the slower of the two frame production rates.

24 Claims, 5 Drawing Sheets

Synchronization Card

MULTIPLE DISPLAY SYNCHRONIZATION APPARATUS AND METHOD

PRIORITY

This application claims priority from provisional application Ser. No. 60/036,120, filed Jan. 17, 1997, entitled "MULTIPLE DISPLAY SYNCHRONIZATION", which is incorporated herein, in its entirety, by reference.

FIELD OF THE INVENTION

The invention generally relates to computer display devices and, more particularly, the invention relates to multiple monitor display devices.

BACKGROUND OF THE INVENTION

Disclosure generally pertinent to preferred embodiments of the present invention is included in the following related applications, all currently having the same assignee as the present application: "High-speed Video Frame Buffer Using Single Port Memory Chips," Ser. No. 60/015,349, filed on Apr. 12, 1996; and "Peer-to-peer Parallel Processing Graphics Accelerator," Ser. No. 08/761,104, filed on Dec. 5, 1996. These related applications are hereby incorporated herein, in their entirety, by reference.

It often is useful in various types of visualization projects to utilize large displays to present visual data to a viewer. This is especially true when the data to be displayed represents an interactive three-dimensional representation of a visual reality, such as an interactive flight simulator or other reality simulator. In such visual reality presentations, it is important that the viewer be immersed as much as possible into the scene being viewed. Consequently, there has been much research into providing many displays (i.e., monitors) around the viewer to trick the viewer into seeing the combination of displays as an accurate representation of a three-dimensional reality. This approach, however, often leads to three fundamental problems. Primarily, there is a tiling problem associated with placing many video displays near each other because a noticeable boarder often is visible between the various displays. This tiling problem may be partially solved by utilizing very large displays to minimize the total number of visible borders. This solution, however, leads to the second problem in that use of large displays commonly is impractical due to the high cost and difficulty of producing such large displays.

The third noted problem, which is the subject matter of this specification and included claims, is ensuring that all of the displays are properly synchronized in a manner that maintains the illusion of reality to a viewer viewing the various displays. A flight simulator, for example, encounters such problems. Specifically, a flight simulator typically shows a contiguous view across various displays of what is considered to be up, down, left, right, and straight ahead of the viewer. Each of these perspectives dynamically changes as the plane moves, in software, to different locations and orientations such as, for example, when the plane is (virtually) turned upside-down. As noted above, it is desirable for each perspective to synchronously change on each display with the other corresponding displays.

As is known by those skilled in the art, realistic displays require the image frames be displayed at a rate of at least twenty-four to frames per second to achieve a flicker-free display to the user. Various displays in known flight simulators, however, frequently show images of very different complexity, thus affecting the frame display rate. Specifically, for simple images such as the sky, very little computational effort is required by a corresponding graphics processor to render the image, and there generally should be no problems in rendering the image at thirty frames per second. Much more processing is required to render more complex images, however, such as the ground, which typically includes trees, grass, and buildings. As a consequence, it often is very difficult for the simulator to update the complex display quickly enough when synchronizing the complex display (e.g., the ground) with a relatively simple display (e.g., the sky). This problem is further complicated by changes in vantage point that result in movement of the images across display boundaries.

Many prior art solutions "solve" such synchronization problems by merely allowing the corresponding simple and complex frames to slip out of synchronization. That is, prior art solutions have merely enabled the displays to refresh as fast as they can in the expectation that they would stay roughly in sync. Undesirably, enabling the displays to be out of sync results in non-real effects, consequently limiting the impression of three-dimensional reality and degrading the effectiveness of the three-dimensional visual display system. For example, because rendering the sky is faster than rendering the ground, it is anomalous to have a sky-view chance (to reflect an orientation change, such as pivoting) before the ground-view changes.

Additional disclosure pertinent to the present invention may be found in the following references: DeFanti, T., Foster I., Papka, M., Stevens R., and Kuhfuss T, *Overview of the I-WAY: Wide Area Visual Supercomputing*, International Journal of Supercomputing Applications, 10(2/3), 1996, pp. 123–130; Pape. D. *A Hardware-Independent Virtual Reality Development System*, IEEE Computer Graphics and Applications, Vol 16.4, July 1996, pp. 44–47; Leigh, J., Johnson A., and DeFanti, T. CALVIN: *an Immersimedia Design Environment Utilizing Heterogeneous Perspectives*, Proceedings of IEEE International Conference on Multimedia Computing and Systems '96, Hiroshima, Japan, June 1996, pp. 20–23; Roy, T. M. and DeFanti. T. A., *Interactive Visualization in a High Performance Computing Virtual Environment*, Proceedings of the 1995 Simulation Multiconference, A. M. Turner (Ed.), The Society for Computer Simulation, pp. 471–476; Cruz-Neira, C., Sandin, D. J., and DeFanti, T. A., *Surround-Screen Projection-Based Virtual Reality: The Design and Implementation of the CAVE*, Proceedings of SIGGRAPH '93 Computer Graphics Conference, ACM SIGGRAPH. August 1993, pp. 135–142; and Miller, Ford, Sigeti and Webster, *Multiscale Terrain Tiling for Real Time Rendering*, Internet article at hyper-text transport protocol address http://-info.ece.ucdavis.edu/~miller/terrain_render_1.html. These related documents are incorporated herein, in their entireties, by reference.

SUMMARY OF THE INVENTION

In accordance with one aspect of the invention, a method of synchronizing, at a system frame display rate, a first set of frames displayed by a first monitor with a second set of frames by a second monitor, utilizes frame production rates of the two sets of frames to set the system frame display rate. More particularly, the first Set of frames are produced at a first frame production rate by a first graphics engine, and the second set of frames are produced at a second frame production rate by a second graphics engine. The first frame production rate and second frame production rate first are compared to determine which frame production rate is slower. The system frame display rate then is set to be no greater than the slower of the two frame production rates.

In accordance with another aspect of the invention, each frame in the first set has a corresponding frame in the second set. The pixelization of each frame on the first monitor is started at approximately the same time as the pixelization of each corresponding frame on the second monitor. This may be performed by aligning the horizontal and vertical sync pulse edges of each frame in the first set with the respective horizontal and vertical sync pulse edges of each corresponding frame in the second set.

In accordance with other aspects of the invention, the system frame display rate may be modified to an override rate, thus overriding the set display rate. Moreover, feedback data identifying either of the frame production rates may be stored in memory for access by a graphics program. The first graphics engine may include a first front buffer and a first back buffer. In a similar manner, the second graphics engine may include a second front buffer and a second back buffer. In accordance with preferred embodiments of the invention, the first front buffer and first back buffer may be swapped at a first time, and the second front buffer and second back buffer may be swapped at a second time, wherein the first time is substantially the same time as the second time. The first monitor and second monitor may be configured to have substantially identical vertical blank periods, where the buffers are swapped at multiples of the vertical blank period.

In accordance with still another aspect of the invention, the first set of frames may have a first display rate and the second set of frames may have a second display rate. In preferred embodiments, the first display rate is set to be substantially equal to the second display rate. The first set of frames thus is displayed at the first display rate, and the second set of frames is displayed at the second display rate.

In accordance with other aspects of the invention, a graphics synchronizer for setting the first frame display rate and the second frame display rate to a selected frame rate includes an input to receive parametric data relating to the first and second sets of frames, a synchronizer to set the first frame display rate and second frame display rate to the selected frame rate relating to the parametric information, and an output to direct the selected frame display rate to the graphics engines. The graphics engines responsively control the monitors to display the first and second frames at the selected frame display rate. The parametric information may be the first and second frame production rates.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF SPECIFIC EMBODIMENTS

Figure 1:
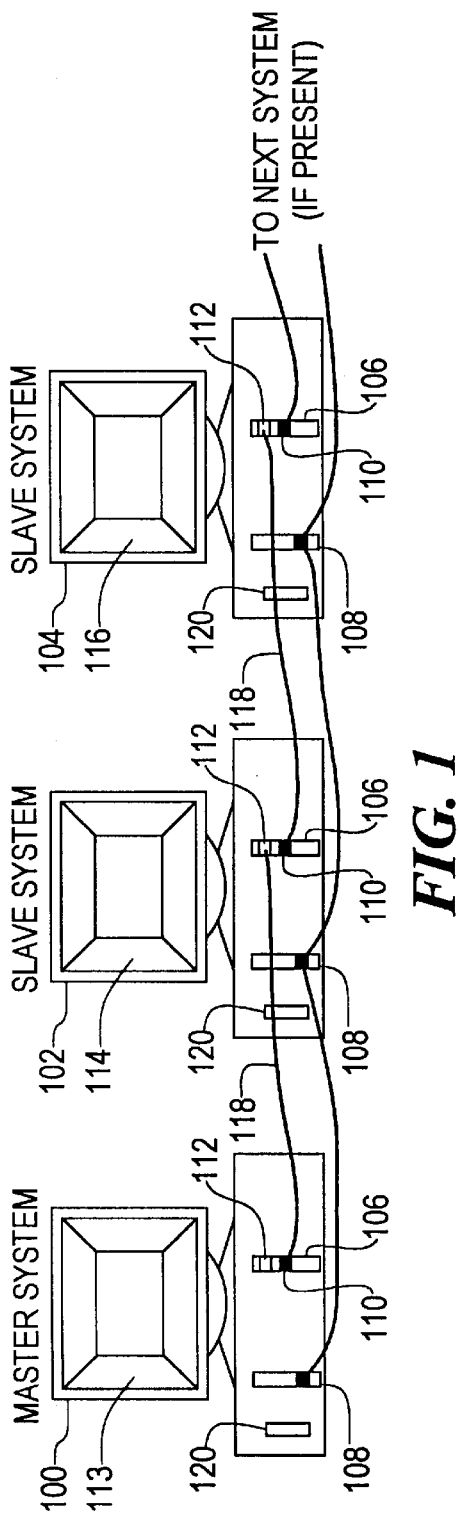
FIG. 1 shows use of a preferred embodiment of the invention implemented as a master computer and two slave computers.

As used in the description and the claims that follow, the following terms and conventions apply: a bit set high means a bit that is set to non-zero; a clear bit is one that is not high; a write-clear bit is one that resets to zero upon writing a non-zero value to the bit; a "#" in a term indicates the term is a low true value; an "&" represents the logical AND operation; an "|" represents the logical OR operation; an "!" represents the logical NOT operation; the term "system" refers to all synchronization cards, graphics boards, geometry boards, and computers used to perform multiple display synchronization; the term "REALIZM"™ and "rlzm" in their various capitalization forms refers to a graphics board being synchronized; and (X . . . Y) represents the range X–Y, so RLZM(0 . . . 3) means RLZM0 through RLZM3.

Preferred embodiments of the invention, referenced herein and within the claims that follow as a "synchronization card", synchronize video timing signals across multiple monitors. These timing signals preferably are generated by a Video Sync Generator ("VSG") module inside the graphics engine of a graphics board. The VSG, which preferably is programmable, generates horizontal and vertical timing markers, in addition to synchronizing screen refresh modules with the video stream. A RAMDAC receives the timing signals that the VSG generates, and transmits them through its pixel pipeline along with the pixel data. The RAMDAC then drives the monitor's sync and analog RGB signals. Preferred embodiments of the invention may be utilized to synchronize graphics boards utilizing double-buffering (discussed below). Such graphics boards may be, for example, the high-speed video frame buffer disclosed in a co-pending provisional application having Ser. No. 60/015, 349.

Preferred embodiments of the invention may be configured so that the graphics boards either are located in a single computer, or spread among multiple computers. If there is more than one computer, for example, each computer may have a single synchronization card, and may contain up to four graphics boards. These are artificial limits that currently are imposed by expansion slot availability in present day preferred host computer architectures. In a preferred embodiment, although the graphics boards do not require a geometry board to function efficiently, one may be used to accelerate processing by the graphics boards.

Synchronization by preferred embodiments the invention includes "frame locking" (described below). As used in this specification and claims that follow, a frame represents a single image of a series of images that arc used to create a moving picture (also referred to as a "motion picture"). "Frame locking", as used herein, generally is the synchronization of the buffer swaps across multiple graphics boards of corresponding frames. Specifically, all buffer swaps take place for corresponding frames at approximately the same time across multiple graphics boards. This causes the swap rate to be determined by the graphics board that is rendering the most complicated image (i.e., the slowest graphics board), so that no graphics board swaps faster than the slowest graphics board. In a preferred embodiment, the frame synchronization cards are programmed so that the buffer swap takes place during multiples of the vertical blank of each monitor. The vertical blank of each monitor thus is synchronized to occur substantially simultaneously.

A preferred embodiment synchronizes the video timing signals across multiple graphics boards to align the edges of the horizontal and vertical sync pulses generated by different graphics boards. This is referred to herein and the claims that follow as "sync locking." This should ensure that the pixelization of the frame to the monitor starts at approximately the same time across multiple graphics boards. As used in this specification and claims that follow, a sync refers to a horizontal, vertical, or composite timing marker used by a display monitor to display output from a graphics board. As with frame locking, sync locking prevents one display from being half a frame ahead of another display, for example, as they both render their corresponding frames from a series of frames to be displayed. Frame locking ensures that both displays are presenting the same corresponding frame of the series of frames shown on each respective display. Sync locking ensures that each display monitor almost simultaneously begins the process of displaying such corresponding frames.

A preferred embodiment also may program a selected frame rate (frames per second), referred to herein as "rate locking." As used in this specification and the claims that follow, frame rate refers to the rate at which the frames are displayed by a monitor or other display apparatus. Rate locking thus refers to setting the rate at which the frames will be displayed. This extends frame locking by having the synchronization card pause a programmable number of vertical syncs before allowing the buffer swaps. If all graphics boards have rendered their images and are ready to be swapped, the synchronization card should wait until the appropriate vertical sync before permitting the buffers to swap. For example, if the video timing is programmed for a vertical refresh rate of 72 Hz, then the synchronization card can be programmed to swap every third vertical sync, thus yielding a frame rate of 24 frames per second. In this case, the synchronization card initiates the buffer swaps on the third vertical sync from the last buffer swap, assuming that all graphics boards have finished rendering their images.

Just as in the frame locking described hereinabove, the (maximum) swap rate is determined by the graphics board rendering the most complicated image. If any graphics board requires longer than the programmed (selected) number of vertical sync periods to render its image, then the synchronization card will swap all buffers on the next available vertical sync after the last image is rendered. Therefore, "rate locking" sets a maximum desired frame rate. If the images being rendered are too complex, the actual frame rate thus will be slower than the programmed rate.

In an alternate embodiment, graphical display software (e.g., flight simulator software) may be configured to determine when to swap the buffers if the programmed number of vertical syncs elapse before the last image has finished rendering. In this embodiment, the synchronization card may be programmed by the software to swap on the next occurrence of vertical sync, or be programmed to wait until the next modulo vertical sync. That is, if the synchronization card is programmed to swap every third vertical sync, and the most complex image required over three vertical sync periods to render, then the buffers will be swapped on the sixth, ninth, twelfth, etc . . . vertical sync from the last buffer swap. A preferred embodiment may be designed to make the control of the buffer swaps even more flexible. Such embodiments may allow the user to program any sequence of vertical syncs on which to swap buffers. For example, waiting two vertical syncs before swapping, then waiting three vertical syncs before swapping, then waiting one vertical sync before swapping, and then repeating the sequence. A preferred embodiment does not limit the user to a single swapping strategy.

The synchronization card also enables graphical software to monitor the time required to render each frame on any and/or all graphics boards. This time data preferably is stored in memory of the synchronization card and made available to software in terms of the number of vertical sync periods and/or fractional part of a vertical sync period that the graphics board required to render an image. The software can use this information to adjust the complexity of the images being rendered so that the programmed frame rate, if using rate locking, may be maintained. Alternate embodiments also may provide the time data in other formats, such as the number of milliseconds required to render an image.

FIG. 1 shows a preferred arrangement of three computers 100, 102, 104 that each have a synchronization card 106 and a communication card 108. In a preferred embodiment, there may be many connected computers, in which one is designated as a "master" computer 100, and the remaining computers 102 and 104 are designated as "slave" computers. In one embodiment, determination of master status is simply through there being a connection to an outgoing data port 110 without a connection to an incoming data port 112. In a similar manner, slave status may be determined by there being a connection present on an incoming data port 112. As this embodiment contemplates a chain formation with the master 100 at the head of the chain, determining the last computer of the chain 104 may be determined by there being a connection to the incoming data port 112 without a connection to the outgoing data port 110.

In another embodiment, the computers may be arranged in a star or ring topology, where master/slave status may be set through initializing a configuration memory on each synchronization card to a predetermined value that indicates the synchronization card's status. However, it is expected that synchronization will be through transmission of synchronization signals from the master computer 100 to the slaves 102, 104, so that the chain topology is sufficient for present preferred embodiments.

The synchronization card may be used for providing a virtual reality demonstration in which a user's field of view of the virtual environment is distributed across multiple display devices (monitors). Such display devices may include video projection units, multiple display monitors 113, 114, 116, or virtual reality headsets having multiple eye screens. Examples of virtual reality environments include a flight simulator or a tank simulator. In such environments, the user may be shown a virtual world across a plurality of display monitors, where each monitor acts as a window to the virtual world, thus displaying the world with respect to the location of the user and the orientation of the window. For example, the cockpit windows of a fighter plane could be replaced with monitors such that a user-pilot may be able "see" the virtual world through the display-windows 113, 114, 116.

In a preferred embodiment, all computers both execute a local copy of the virtual reality program (e.g., a flight simulator program), and maintain a local copy of the reality-database that defines the reality. However, with a sufficiently high-speed storage-access solution, such as a fast RAID implementation coupled with a fiber optic backbone, there may be a single central database accessed by all computers. Note that such an implementation might require a separate (third) controller card dedicated to processing the high-speed piping of the reality-database information to the computers 100, 102, 104.

In preferred embodiments, the communication card 108 is a common networking card. Specifically, the communication card 108 transfers, from the master computer 100 to the slave computers 102, 104, the positional, directional, velocity, and acceleration data related to the activities of the user from the virtual reality program. Transfer of such data allows the slave computers to coordinate execution of the virtual reality program based upon the user's actions. The synchronization card correspondingly sends video timing information between the systems to both synchronize the multiple displays 113, 114, 116 of the different computers 100, 102, 104, and to synchronize of the buffer swaps.

In a motion picture, the human eye perceives a series of computer generated images as a continuous (non-discrete) presentation when presented at a rate of at least twenty-four frames per second. Consequently, graphics board designers have developed multi-buffered boards ("double buffered" boards) to increase presentation speed of the frames by rendering successive frames in successive buffers while the frame data in a previous buffer is displayed. Switching between such buffers is called "buffer swapping." When using preferred embodiments of the invention. the master computer controls the buffer swaps by sending a swap command to itself and to the slave devices at selected times. This coordination of buffer swapping is utilized in frame locking processes. As suggested above, frame locking solves a problem inherent to splitting a user's field of view across multiple display devices controlled by different graphics boards in which some of the displays are updated by the graphics engines faster than others. An example of this is a flight simulator. For example, a user virtually flying a fighter plane may have a first of the plane's display-windows showing the ground, and a second display-window showing a clear blue sky. The ground display thus has a much more difficult image to render than does the air display. The sky could be rendered almost immediately, while the ground may take much more time to render. If the different graphics boards were allowed to operate independently and not synchronously, then a user may see various anomalies. For example, the sky scene may be rendered and displayed at hundreds of frames per second, while the ground scene may be rendered and displayed at barely twenty-four frames per second. This can lead to peripheral flickering and eye strain to the user, as the user's eyes may no longer be able to integrate the series of frames.

Preferred embodiments of the present invention provides frame locking to prevent these synchronizing problems by preventing faster swapping by a graphics board 120 having the simpler image to display. Each slave 102, 104 is required to send a signal over the sync link 118 connecting the synchronization cards 106. After receiving notification from all slaves that they are ready to swap their buffers, the master 100 sends a swap command to all slave computers. In a preferred embodiment, the buffer swap takes place during the vertical blank period of the monitor refresh to ensure that the user does not see the swapping take place.

The vertical blank period should occur almost simultaneously for all monitors, due to sync locking, resulting in all displays 113, 114, 116 almost simultaneously switching to the next frame in a corresponding set of frames. Such coordination is achieved by synchronizing the graphics boards 120 through an initialization process that sets all boards to the same horizontal and vertical refresh frequencies, and directs the boards to follow a common clock signal for timing initiation of the vertical refresh. This initialization is partially controlled by the frame synchronization card. Although signal propagation delays may result in slight variations in the timing of the refresh, such propagation delay is insignificant in comparison to the vertical blank time and should cause no abnormalities in a preferred embodiment. That is, although propagation delays may introduce delays resulting in one display being a scan line ahead of another, this delay is unnoticeable to the user's eye. If required, alternate embodiments could account for the propagation delays to have each graphics board 120 adjust itself for the delay.

Figure 2:
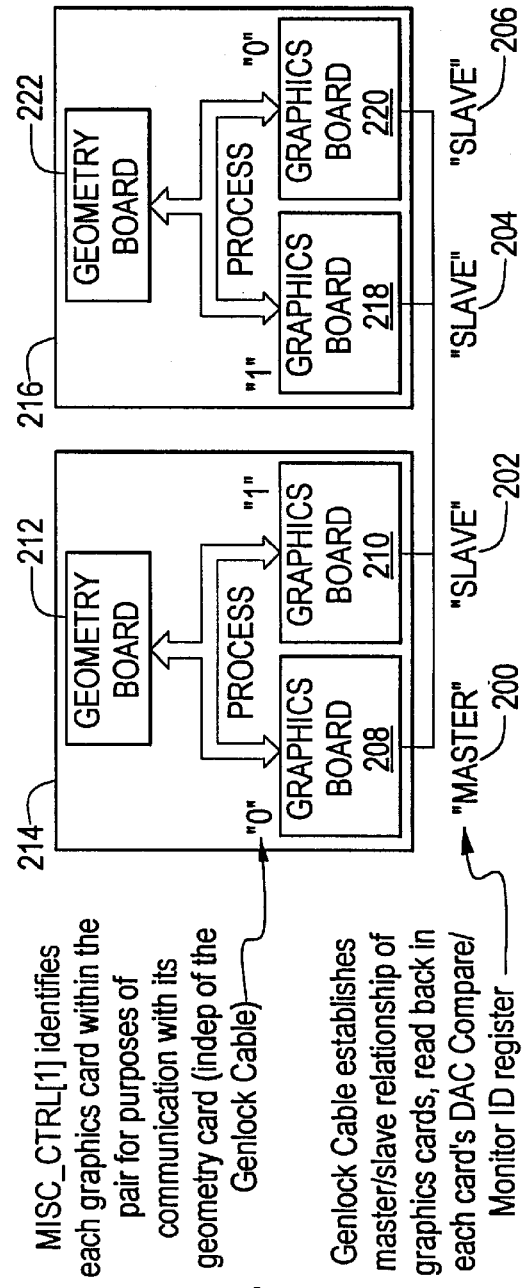
FIG. 2 shows an alternative embodiment of the invention in which various master graphics boards and slave graphics boards are located within the same computer systems.

FIG. 2 shows an embodiment having a master computer 200 and three slave computers 202, 204, 206. More particularly, the master 200 and first slave 202, while having separate graphics boards 208, 210, are both installed within the same computer 214. Both graphics boards 208, 210 are accelerated by the same geometry accelerator 212. In a similar manner, the third and fourth slave computers 204, 206 are both installed within the same computer 216. Each slave has a graphics board 218, 220 accelerated by a single geometry board 222. In an alternate embodiment, so long as there is a sufficiently fast data connection to the graphics boards 208, 210, 218, 220, then the geometry boards 212, 222 could be in a separate computer system from the graphics boards.

Figure 3:
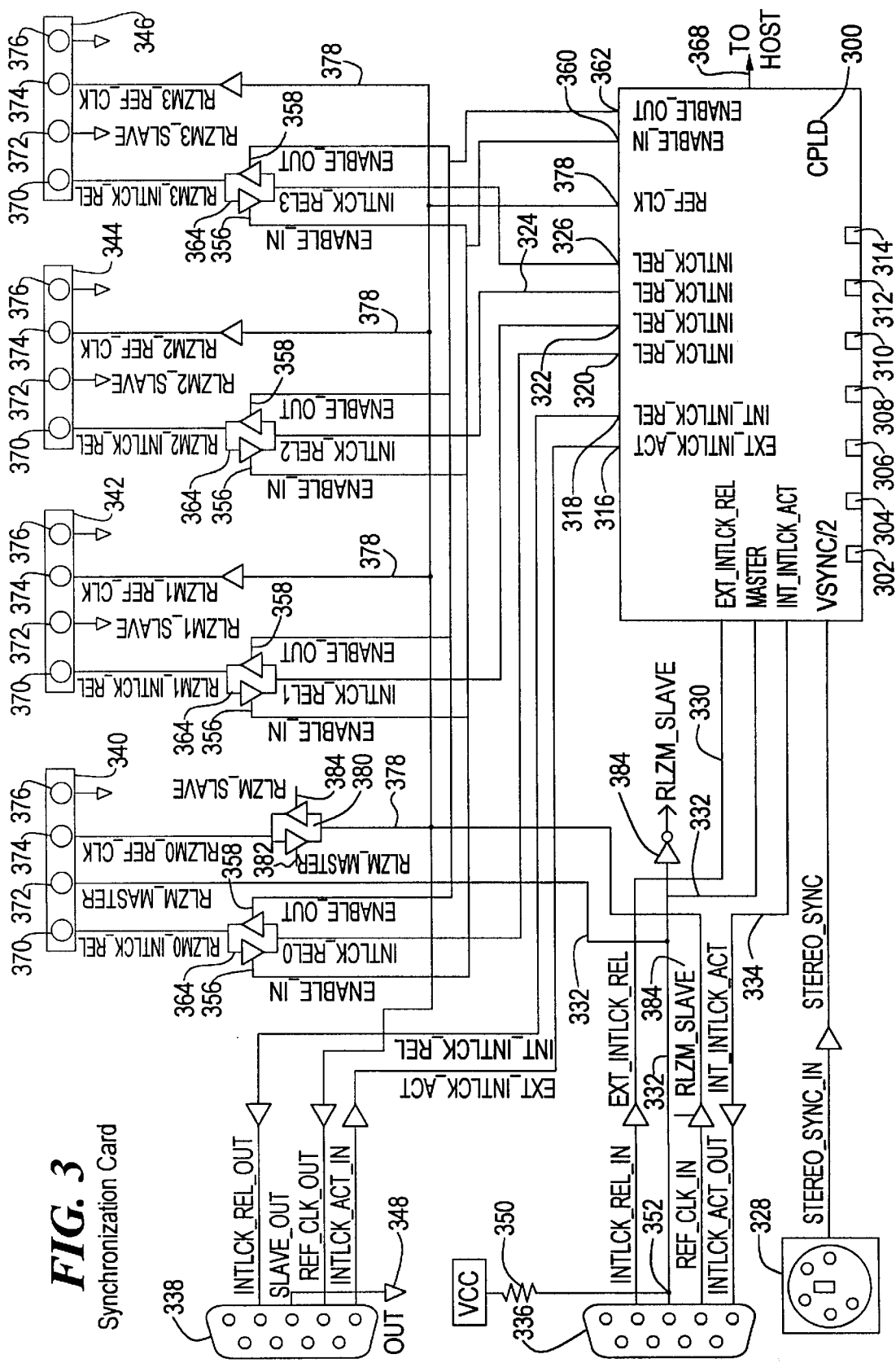
FIG. 3 schematically shows a synchronization card that may be utilized to implement a preferred embodiment of the invention.

FIG. 3 is a schematic diagram of a synchronizing card that may be utilized to implement a preferred embodiment of the invention. More particularly, FIG. 3 shows details of data lines and registers that may be utilized to implement a preferred embodiment of the synchronization card. The CPLD block 300, which includes configuration registers 302–314 and data lines 316–334. 360, 362, 378 control the card's operation. Each register, unless stated otherwise, has a PCI method of access. The control lines are more fully described below after a discussion of the registers. It should be noted that the details of the data lines and registers shown in FIG. 3 are exemplary and thus, should not be construed to limit the scope of the invention.

Each synchronization card has a FRAME_CTRL register (Frame Control register) that is readable/writable. The contents of this register are as follows.

A SYNC_FRAME_EN (Synchronous Frame Enable) bit, when set high, enables synchronous buffer swapping (the synchronous release of interlocks by the synchronization card). At power up of a synchronization card, this bit is cleared so that synchronous frame swapping is disabled until all synchronization cards may be first initialized. When synchronous frame swapping is disabled, in a preferred embodiment, interlocks may be released using the SYNC_INTLCK bit in the MISC_CTRL register. or the INTLCK_H bit in the PCIDMA's CSR register. This bit is qualified with a second signal that indicates whether or not the synchronization card is in the system that contains the master graphics board. The bit is only valid in the system that contains the master graphics board.

As noted above, the designation of one of the synchronization cards as a "master board" is made by the synchronization card having an outgoing connection from the out connector 338 without a corresponding incoming connection to the in port 336. In a preferred embodiment, a presumption is made that for each graphics board in a given computer system, each graphics board is sequentially attached to the first 340, second 342, third 344, and then fourth 346 graphics board ports, and that the graphics board attached to the first port 340 may be designated the master board for the entire system. Master status is determined by combining a high-value true control line 332 leading from the RLZM_MASTER connection 372 of the first port 340 with pin line 352 of the in-connector 336, which leads to a VCC pull-up resistor 350. In a preferred embodiment, if the control line 332 for a synchronization card is grounded out, then such synchronization card is considered to be a slave card. The control line 332 only becomes grounded out when there is a connection from the out connector's ground pin 348 of a first card to the in-connector's corresponding pin line 352 of a second card. Therefore, determination of master status is automatic as only the master will not have an incoming connection to ground out the in-connector 336.

REALIZM_PRSNT (graphics boards present) is a bit field containing a bit mask indicating the number of graphics boards present in the system. This field may be initialized by software to indicate the correct number of graphics boards that are in the system, where the software has simply polled the host computer's bus to determine how many graphics boards are present. In a preferred embodiment, it is assumed that the synchronization cards are linked in a chain as shown in FIG. 1. Alternate embodiments could simply transmit messages through the graphics board ports 340, 342, 344, and 346, such that the graphics cards identify how they are connected to the synchronization card. For a four board maximum configuration, the bit field could be 2 bits long and interpreted as a binary number. The bit field may be four bits long, where the bits could be positionally set high to reference which board ports have graphics boards connected. Their values also may be set by dip switches. In a preferred embodiment using the 4 bit scheme, REALIZM_PRSNT="0001" for a single attached graphics board, "0011" for two boards, etc . . . The REALIZM_PRSNT field is used by the hardware to determine how many boards must be in interlock (i.e., to determine which of the four ports 340–346 to sample) before the synchronization card will indicate that it is ready for the buffer swap. That is, as described above, preferred embodiments of the present invention may force the graphics cards to pause before displaying its next frame buffer until all graphics cards in the system are ready (e.g., in interlock) to display the next buffer.

INTLCKS_ACTIVE (Interlocks Active) is a single read only bit. This bit is high when the synchronization card has detected that all graphics boards in the system and all graphics boards downstream have executed an interlock command and are waiting on the release. In a preferred embodiment, the ready status is determined by each graphics board attached to the graphics board ports 340–346 having pulsed the RLZM(0 . . . 4)_INTLCK_REL lines 320, 322, 324, 326. In one embodiment, the pulse is implemented when the graphics board sets two bits in the TEX_RGB_EN register (described hereinbelow) high, and then low. This signal, however, could be anything such that the synchronization card has received an indication that the signaling graphics board has finished rendering to its display buffer and is now ready to display that buffer. The INTLCKS_ACTIVE bit reflects the state of the signal INT_INTLCK_ACT within the CPLD 300 on line 334. If set, the SYNC_FRAME_EN bit will clear itself each time the interlocks are released. If the SYNC_FRAME_EN bit is clear, then the INTLCKS_ACTIVE bit will clear itself when the control software releases the interlocks. If this bit is read from the system that contains the master graphics board, it will indicate that all graphics boards including boards in other systems are interlocked.

INTLCKS_REL (Interlocks Released) is a write-clear bit that is set high when the synchronization card has released the interlocks on all graphics boards. In a preferred embodiment, this bit can be used to determine when the buffer swap took place on each system. In an alternate embodiment, this bit may generate a system interrupt every time a buffer swap occurs. This way, when an interrupt occurs, the controlling software may inspect the INTLCKS_REL bit to determine if releasing the interlocks caused the interrupt.

VSYNC_INT_EN (Vertical Sync Interrupt Enable) is a single bit that when set high, causes the synchronization card to generate a system interrupt when the vertical sync is detected.

VSYNC_INT_ACT (Vertical Sync Interrupt Active) is a write-clear bit that when set high, indicates that the synchronization card has detected a vertical sync and is generating a system interrupt. The VSYNC bits, in a preferred embodiment, offer the ability to interrupt the host system at the vertical sync level rather than at the swap level.

The second register is the VSYNC_MODULO (Vertical Sync Modulo) register, which is readable/writeable. The contents of this register are valid only on the system having the graphics board that is defined as the master. The contents of this register are ignored in systems that have only slave graphics boards. The contents of this register are as follows.

VSYNC_MODULO (Vertical Sync Modulo) is a bit field containing the vertical sync modulo to be used when swapping buffers (i.e., releasing the interlocks). This field is set by software during initialization of the synchronization cards. If the SYNC_FRAME_EN bit is set, then the synchronization card will release the interlocks on all graphics boards on the modulo vertical sync, or the nearest one after it. That is, buffer swapping can be set to occur every $n^{th}$ vertical sync. In a preferred embodiment, if the graphics board is not ready to swap when the set vertical sync passed, then the swap occurs at the next possible sync when all graphics boards are ready to swap. In addition, a swap may be made immediate by setting this value to zero, meaning swap after no vertical syncs have passed so that the only delay is from a graphics boards not being ready yet (not yet in interlock). If all the graphics boards were not in interlock when the $n^{th}$ vertical sync occurred, in a preferred embodiment the synchronization card will wait for all boards to be interlocked and then release the interlocks on the next occurrence of vertical sync. This allows, by default, for synchronization of frame rates even when one of the displays is operating more slowly than desired. All graphics boards are required to wait for the slowest board so that the other graphics boards do not get out of sync.

A third register is the FRAME_TIME (Frame Rendering Time) register. These registers are read only and arc valid on all systems (master and slaves). Each graphics board has a corresponding FRAME_TIME register. If the frame rendering time overruns the two counts in this register, preferably both counts will stop at their maximum values. The contents of this register are as follows.

LINE_TIME (Line Time Count) is a bit field containing the count of the number of time periods that have elapsed between the last vertical sync and the reception of the frame completion (interlock) status from the corresponding graphics board. This field may be used to determine the fraction of a vertical sync period has passed since the last buffer swap. In a preferred embodiment, the time period that is computed by dividing a reference clock value (the basic clock from the master graphics board that is driving all synchronization efforts) by 128. In preferred embodiments, the clock on the master graphics board (running at 14.31818 MHZ) is used as the reference clock for the system, resulting in a time period of about 8.94 microseconds (i.e., 14.31818 MHZ/128). The clock rate may be a different value (i.e., 12 MHZ) since whatever speed clock is received from the master graphics board will be used to compute a time period. The time period should be used along with the VSYNC_

TIME register, VSYNC_COUNT field, and the VSYNC_MODULO register to determine when the rendering time is approaching the maximum allowable time before missing a scheduled frame swap. This field is the fractional portion of the frame rendering time for the last frame. In a preferred embodiment, the reference clock signal is generated by the graphics board attached to the first graphics board port 340 of the master synchronization card. The reference clock is passed into the synchronization card on the RLZM0_REF_CLK line 378. Note that for the first port 340, the clock reference line 378 passes through a bidirectional buffer 380 that either allows the clock signal to come in from the master graphics board at port connector 374, or flow out of the synchronization card as a clock source for attached graphics boards. The direction of this buffer is set through two control lines 382, 384. For the other three ports, 342, 344, 346, because there is no master/slave issue, the direction of the signal is hard-wired to be an outgoing signal from each synchronization card. In this fashion, the master graphics board can set the clock rate for all other graphics boards within the system.

VSYNC_COUNT (Vertical Sync Count) is a bit field containing the count of the number of vertical syncs that occurred between the last frame swap and the reception of the frame completion (interlock) status from the corresponding graphics board. It should be used along with the LINE_TIME field, VSYNC_TIME register, and the VSYNC_MODULO register to determine when the rendering time is approaching the maximum allowable time before missing a scheduled frame swap. Whereas the LINE_TIME field tracks the fractional portion of a vsync period, the VSYNC_COUNT tracks the number of complete vsyncs that have passed.

A fourth register is VSYNC_TIME (Vertical Sync Time) register, which is read only, is valid on all systems. If the vertical sync time overruns the count in this register, then the count will stop at its maximum value. The contents of this register are as follows.

VSYNC_TIME (Vertical Sync Time count) is a bit field containing the count of the number of time periods that have elapsed from the last vertical sync to the current vertical sync. In a preferred embodiment, the bit width of this register should be such that all valid vertical timings can be represented by a count in this register. This register should be used as the unit of time when checking the LINE_TIME field of the FRAME_TIME registers. Using the above referenced time period of 8.94 microseconds, the sample rate yields a count of approximately 559 for a vertical refresh rate of 200 Hz. The bit width of this field and the sample rate yield a minimum vertical refresh rate of about twenty-eight Hz.

INT_INTLCK_ACT in the CPLD on line 334 is asserted when EXT_INTLCK_ACT in the CPLD on line 316 is asserted and all of the graphics boards that are connected to the synchronization card have sent a signal to the CPLD indicating that they are in an interlocked state. The synchronization card hardware should automatically de-assert INT_INTLCK_ACT when the interlocks have been released.

The ENABLE_IN 360 and ENABLE_OUT 362 of the CPLD 300 are the source for the control lines that determine the direction of the bi-directional buffers 364. FIG. 3 shows a single ENABLE_IN 360 and ENABLE_OUT 362 within the CPLD. An alternate embodiment may have a separate ENABLE_IN and ENABLE_OUT line leading to each of the bi-directional buffer's 364 direction-select ENABLE_IN 356 and ENABLE_OUT 358 control lines. When the ENABLE_IN 360 control line is asserted, data flows from the graphics board ports 340, 342, 344, 346 to the synchronization card. This is the default mode at power-up of the synchronization card. Similarly, when the ENABLE_OUT is asserted, data flows from the synchronization card to the graphics boards.

The status of line ENABLE_IN 360, in one preferred embodiment, may be calculated from the following relationship involving MASTER on line 332, the SYNC_FRAME_EN register bit in the FRAME_CTRL register, and INT_INTLCK_REL on line 318: ((MASTER & !SYNC_FRAME_EN)|(SYNC_FRAME_EN & !INT_INTLCK_REL)).

The status of line ENABLE_OUT 362, in one preferred embodiment, may be calculated from the following relationship involving low-true SLAVE# (note that SLAVE#= !MASTER), the SYNC_FRAME_EN register bit in the FRAME_CTRL register, and INT_INTLCK_REL on line 318: ((SLAVE# & !SYNC_FRAME_EN)|(SYNC_FRAME_EN & INT_INTLCK_REL)).

In addition to the registers disclosed above, FIG. 3 discloses a preferred embodiment of a synchronization card having the following connectors: the four graphics board ports 340, 342, 344, 346, the in-connector 336, the out-connector 338, the sync signal connector 328, and the bus communications path 368 used by the synchronization card to communicate with the host computer's bus.

Each graphics board port 340, 342, 344, 346 preferably has four connectors. The first connector 370 on lines 320, 322, 324, 326 carries the INTLCK_REL to and from the synchronization card and the graphics board through the bi-directional buffer 364. This is the control line that the graphics board utilizes to signal the synchronization card that the graphics board has finished rendering into its display buffer. In a preferred embodiment, while a (front) buffer is presently being displayed to a display monitor, the graphics board is rendering the next frame to its second (back) buffer. When this double-buffering operation is completed, then a signal is sent to the synchronization card through the first connector 370.

The second connector 372 on line 332 of the first port 340 carries the RLZM_MASTER signal. This connector is set high by default, indicating that the graphics board attached to this board is the master graphics board for the system. Only by grounding this line out through a connection between pin line 352 of the in-connector 336 and the ground 348 on the out connector 338 will the status of the line 332 and port connector 372 be set low to indicate that the synchronization card is a slave card. In a preferred embodiment, by convention, it is required that the master graphics board be connected to the first port 340. Consequently, there is no master/slave issue for the other ports so the connector 372 for the other ports 342, 344. 346 are permanently grounded out to indicate slave status. In alternate embodiments, polling of attached boards may take place to avoid this hard-wired of solution to master/slave identification.

The third connector 374 on line 378 carries the reference clock signal to and from the graphics boards attached to the graphics board ports 340, 342, 344, 346. For the first port 340. the clock line 378 contains a bi-directional buffer 380 that, depending on control lines 382 and 384, either receives a clock signal from an attached master graphics board for the system, or sends a clock signal to a slave graphics board. Setting the control line depends on whether the attached graphics board is the master graphics board. For the graphics boards attached to the other ports, 342, 344, 346, the direction of data is hardwired to flow from the synchronization card to the attached graphics board.

The fourth connector 376 for each port 340, 342, 344, 346 is permanently grounded out. This line aids in transmitting the reference clock signals to the slave graphics boards. In a preferred embodiment, for signaling purposes, the ground and the reference clock line 378 are intertwined as the signal is sent to slave graphics boards.

The in-connector 336 carries the INTLCK_REL_IN signal to line 330, which appears within the CPLD 300 as the EXT_INTLCK_REL. The EXT_INTLCK_REL signal is a command from the master synchronization card that causes the receiving synchronization card to send a swap request to its attached graphics boards, as well as to forward the signal downstream to the next synchronization card in the chain by asserting the INT_INTLCK_REL line within the CPLD 300.

The in-connector 336 also has a pin line 352 connected to line 332 which is used in conjunction with a VCC resistor 350 (as described above) to establish the master/slave status of a synchronization card. The in-connector 336 also carries the REF_CLK_IN signal to line 378 to the bi-directional buffer 380. The REF_CLK_IN signal is the reference clock signal that was passed downstream from the upstream synchronization card. As described above, if there is a connection to the in-connector 336, then this synchronization card must be a slave card. Consequently, when an incoming connection exists, the graphics board slave control 384 is also asserted to have the REF_CLK_IN signal drive the clock of the slave graphics board attached to graphics board port 340.

The in-connector 336 also carries the INT_INTLCK_ACT signal from the CPLD 300 to line 334 to the INTLCK_ACT_OUT connector on the in-connector. The INT_INTLCK_ACT is asserted after all graphics boards attached to the present synchronization card are ready to swap their buffers, and after having received the EXT_INTLCK_ACT signal, which indicates all downstream synchronization cards are ready to swap. This communicates out of the in-connector 336 to the upstream synchronization card that all graphics boards for this synchronization card and all graphics boards downstream of this card are ready to swap.

The out connector 338 carries the INTLCK_REL_OUT signal from line 318, which originates from the INT_INTLCK_REL signal within the CPLD 300. The CPLD 300 asserts INT_INTLCK_REL to send a signal to the next synchronization card downstream that the downstream card's graphics boards should swap their buffer. As discussed above, the downstream card should also assert its INTLCK_REL_OUT to forward the swap request to a further downstream synchronization card.

The out connector 338 also has a SLAVE_OUT# pin 348 that is used in conjunction with the VCC resistor 350 on line 352 to determine, as discussed above, the master status of the graphics board attached to the master graphics board port 340.

The out connector 338 also carries the REF_CLK_OUT signal from line 378. As disclosed above, there is only one master graphics board in the system, and that graphics board is generating the reference clock signal for all other graphics boards in the system. Although the reference clock signal could be moved to the master synchronization card (the first synchronization card in the chain) so that it would drive all graphics boards in the system, preferred embodiments allow the master graphics board to determine the reference clock rate. When a synchronization card's out connector is connected to a synchronization card's in-connector, the REF_CLK_OUT and REF_CLK_IN pins are in communication with each other. This received clock signal then is transmitted to all slave graphics boards over line 378.

The out-connector 338 also carries the INTLCK_ACT_IN signal, on line 316 which, as disclosed above, receives notification that all downstream synchronization cards are ready to swap their buffers. This signal is propagated upstream to the master synchronization card. Once the master synchronization card has received notifications from all downstream synchronization cards, it waits for the appropriate vertical sync according to the programmed VSYNC_MODULO. Then, the master synchronization card sends the swap request to all synchronization cards (including itself) to substantially simultaneously swap all buffers for all graphics boards in the system. Other embodiments could have the swap request originating from the master graphics board. In addition, one embodiment may require that a synchronization card in the chain stall until it has received the INTLCK_ACT_IN signal from downstream, while another may allow each synchronization card to asynchronously signal the master synchronization card of their status.

The sync signal connector 328 is used as the source for the vertical sync rate, which is received in the CPLD 300 at the VSYNC/2 line. As with the reference clock rate, the master graphics board sets the vertical sync rate for all graphics boards in the system. The master synchronization card may be used in alternate embodiments to set the vertical sync rate for all graphics boards in the system.

The host bus connector 368 is used by the synchronization card to communicate with the host computer's bus to exchange data with hardware and/or software processes being executed upon the host.

Figure 4:
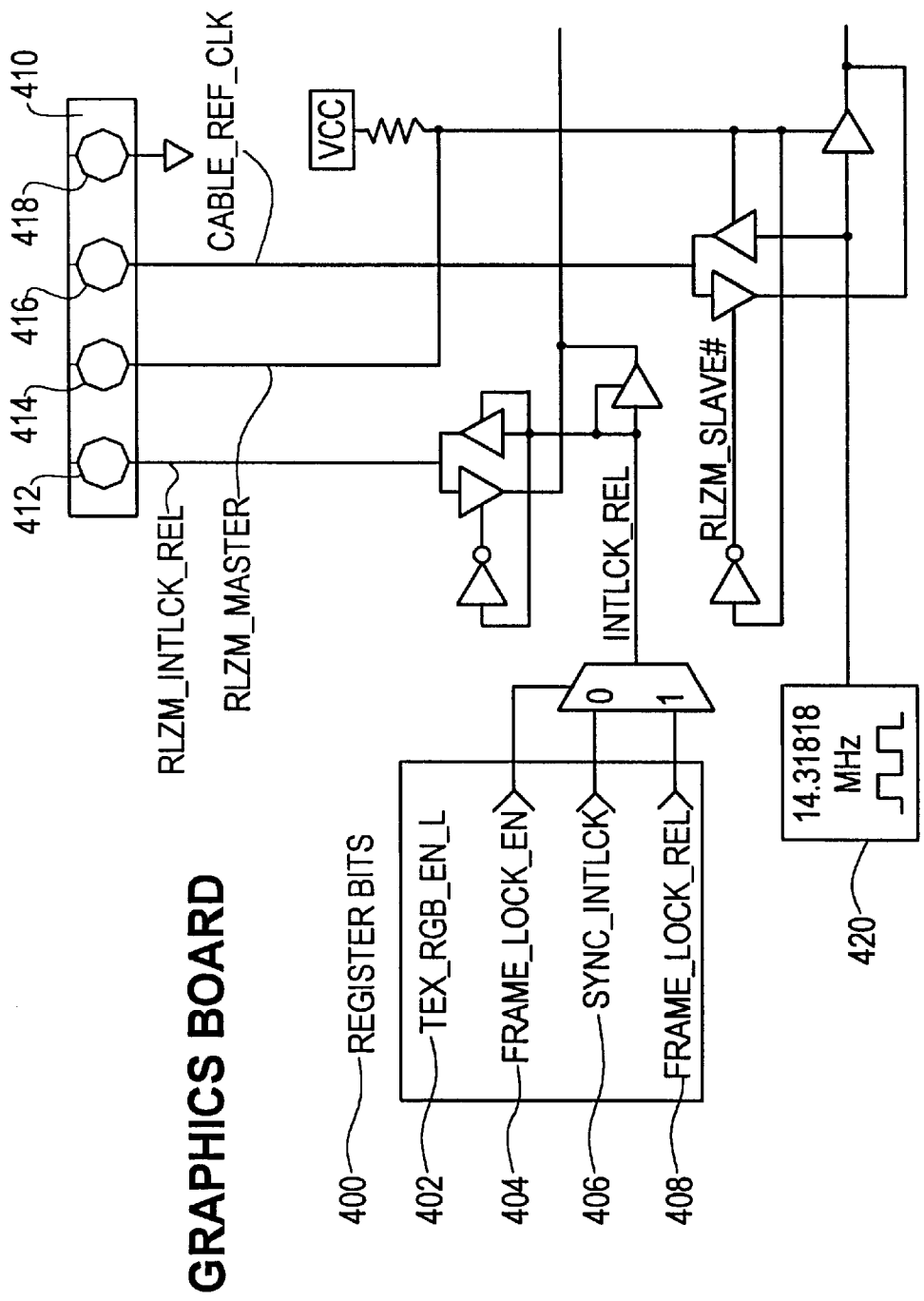
FIG. 4 schematically shows a graphics board that may be utilized in preferred embodiments of the invention.

FIG. 4 is a schematic diagram showing the components that preferably are included on a graphics board that is to work in conjunction with the synchronization card shown in FIG. 3. As referenced above, a preferred embodiment for the graphics board is the graphics board disclosed in the co-pending provisional application having Ser. No. 60/015,349.

In a preferred embodiment, two new bits are added to the graphics board's registers 400. In particular, the two new bits should be added to the TEX_RGB_EN register, and be available if the ID PROM's Synchronous Frame Support bit is asserted. The TEX_RGB_EN register is write only. In a preferred embodiment, this register may be accessed via the graphics card's LoadRAMDAC request. To access the TEX_RGB_EN register in this fashion, the software control program should first set the VSM_EXISTS bit of the GE_CONFIG register. The TEX_RGB_EN register preferably contains the following entries:

TEX_RGB_EN_L (Texture Red/Green/Blue Enable) 402 located at bit 0. Asserting this bit low enables the RGB texture memory for access via put, get, and texturing operations. De-asserting this bit high disables RGB texture memory from storing write data, and causes all read or texturing operations to return RGB texture data of 0xffffff. Alpha texture memory is unaffected by this bit.

FRM_LOCK_REL (Frame Lock Release) 408, located at bit 1, serves two purposes. Specifically, in a system with multiple graphics boards and no synchronization card, this bit is used to synchronously release multiple boards from Interlock. Once multiple boards are in Interlock, the Interlocks can be released synchronously by asserting and then de-asserting this bit. This bit is used to send a pulse to the synchronization card. The pulse is used to send status to the synchronization card through the FIFO stream to notify the synchronization card that a frame is ready and an interlock command is pending. This bit has no effect when FRM_LOCK_EN is de-asserted. This bit should be clear during normal system operation.

FRM_LOCK_EN (Frame Lock Enable) 404, located at bit 2, acts as a MUX select between the SYNC_INTLCK 406 bit in the registers 400 and the FRM_LOCK_REL 408 bit. When this bit is high, the SYNC_INTLCK 406 bit is disabled and the FRM_LOCK_REL 408 bit is enabled. When this bit is low, the SYNC_INTLCK bit in the registers is enabled and the FRM_LOCK_REL 408 bit is disabled. This bit should be low during normal system operation.

In addition to the above noted register additions to the preferred graphics board, the master graphics board preferably also has a reference clock generator 420 that is used to drive all reference clock lines for all synchronization cards and graphics boards within the system. This clock signal forms the basis for synchronizing video timing and buffer swaps.

There also may be a connector 410 having port connectors 412, 414, 416, 418 that correspond to the port connectors 370, 372, 374, 376, of the synchronization card shown in FIG. 3.

Figure 5:
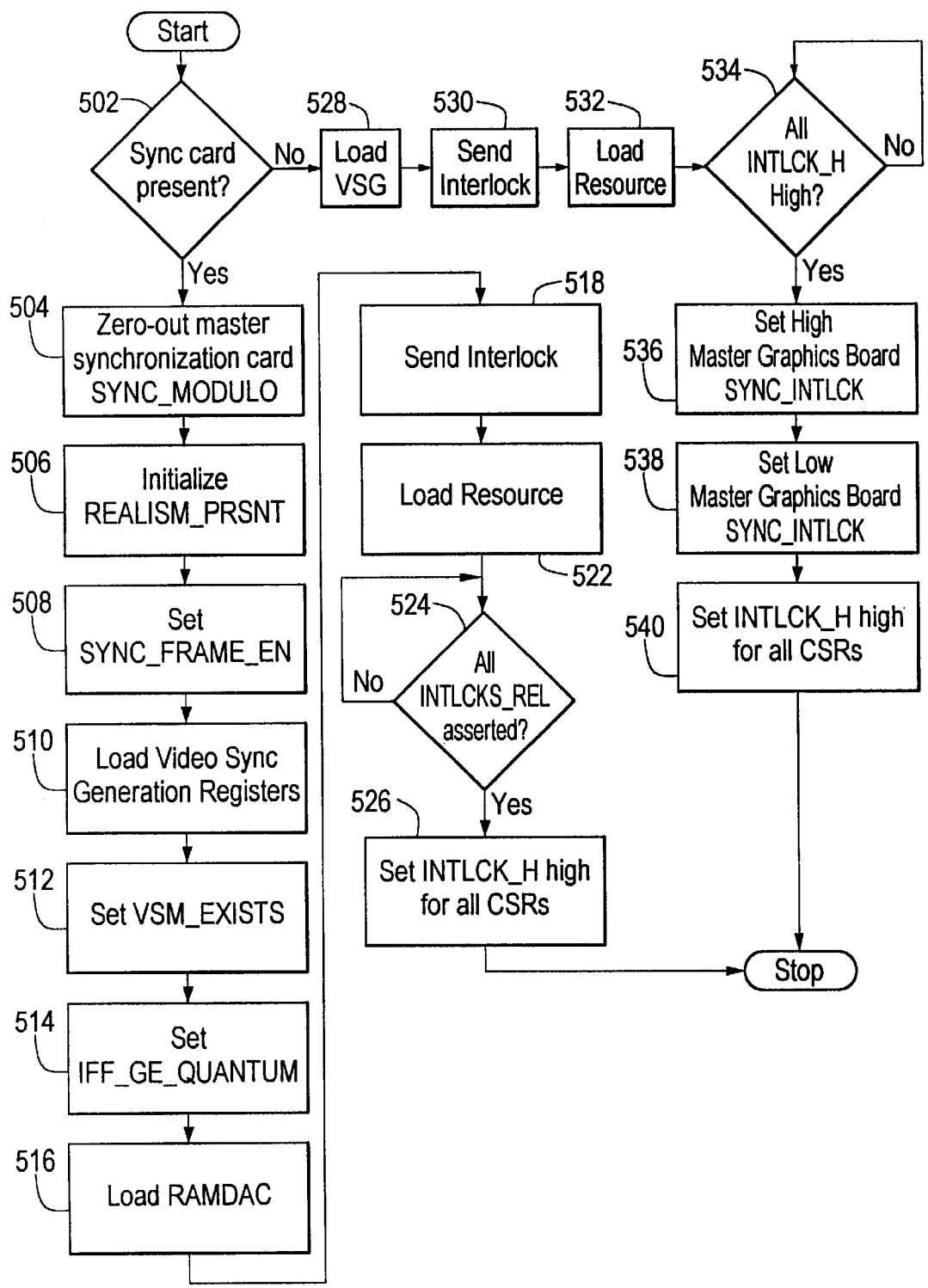
FIG. 5 is a flow chart showing a preferred process of synchronizing video timing for multiple graphics boards.

FIG. 5 is a flow chart showing a preferred process for synchronizing the video timing for multiple graphics boards that exist in the same system or across multiple systems.

At step 502, the presence of a synchronization card is tested. If a synchronization card is present, at step 504, the VSYNC_MODULO field of the VSYNC_MODULO register on the master synchronization card (i.e., the synchronization card in the host computer containing the master graphics board) is set to zero-out. At step 506, the REALIZM_PRSNT field in the FRAME_CTRL register on all synchronization cards is initialized. At step 508, the SYNC_FRAME_EN bit in the FRAME_CTRL register on the master synchronization card is set. At step 510, the Video Sync Generation (VSG) registers in all graphics boards are loaded with appropriate values for the desired display resolution. At step 512 the VSM_EXISTS bit (bit 2) of the GE_CONFIG register in all graphics engines is set. At step 514 the IFF_GE_QUANTUM register in all graphics engines is set to a predetermined value. At step 516, a LoadRAMDAC command is sent to all graphics boards to toggle the FRM_LOCK_EN and FRM_LOCK_REL bits from low to high to low again. At step 518, immediately following the LoadRAMDAC command, an Interlock command is sent to all graphics boards. At step 522, a LoadResource command, immediately after the Interlock command, is sent to all graphics engines to assert the VSG_RUN bit. The LoadResource command will be held until the interlocks have been cleared.

At step 524, the process is paused until all of the INTLCKS_REL bit in the FRAME_CTRL register for all synchronization cards to be asserted, indicating that the interlocks for all graphics boards have been released. Then at step 526, the INTLCK_H bit (bit 6) of the CSR is set high on all graphics boards. This will clear the interlock bit in the PCIDMA chip for all boards. The graphics engines on all graphics boards will have already seen the interlock clear. This simply cleans up the system.

If a synchronization card is not present at step 502, then the process continues to step 528 in which the Video Sync Generation (VSG) registers are loaded in all graphics boards with appropriate values for the desired display resolution. At step 530, an Interlock command is sent to all graphics boards. At step 532, a LoadResource command is sent, immediately after the Interlock command, to all graphics engines that assert the VSG_RUN bit. The LoadResource command is held until the interlocks have been cleared. At step 534 the process is paused again for the INTLCK_H bit (bit 6) of the CSR to be high on all graphics boards. At step 536, the SYNC_INTLCK bit (bit 3) of the Miscellaneous Control Register on the master graphics board is set high. This bit, when asserted, causes the interlocks to be cleared concurrently on all boards. Note that in a preferred embodiment, this bit should be low during normal system operation. At step 538, the SYNC_INTLCK bit (bit 3) of the Miscellaneous Control Register on the master graphics board is set low. Note that in a preferred embodiment, the SYNC_INTLCK bit in the Miscellaneous Control Registers on all slave boards should always should be low. At step 540, the INTLCK_H bit (bit 6) of the CSR on all graphics boards is set high. This will clear the interlock bit in the PCIDMA chip for all boards. The graphics engines on all graphics boards will have already seen the interlock clear. This simply cleans up the system.

Figure 6:
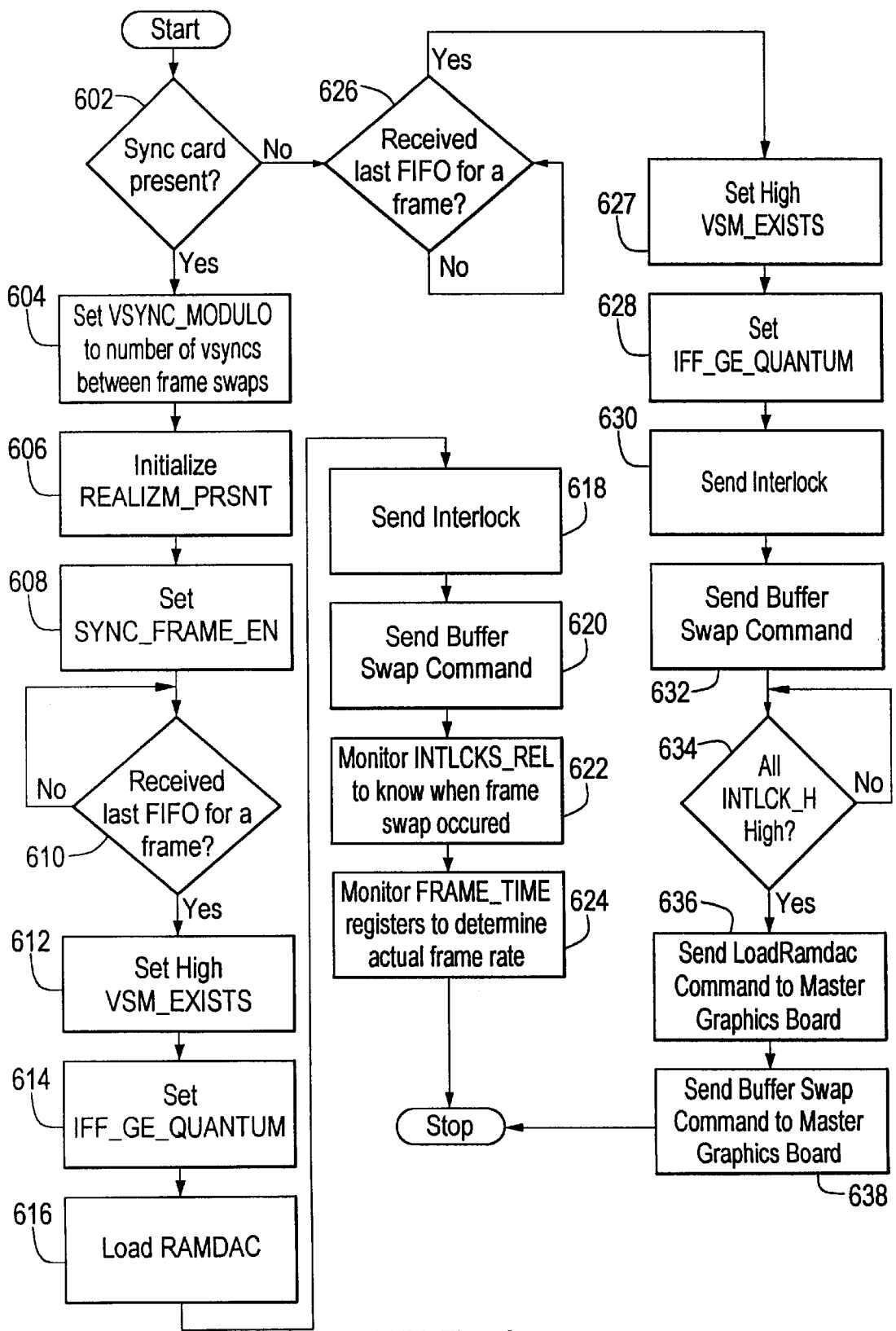
FIG. 6 is a flow chart showing a preferred process for synchronizing buffer swaps across multiple graphics boards.

FIG. 6 is a flow chart showing a process for synchronizing frames (buffer swaps) across multiple graphics boards that exist in the same system, or across multiple systems.

At step 602, it is determined if a synchronization card is present. If present, at step 604, then the VSYNC_MODULO field of the VSYNC_MODULO register is written with the desired number of vertical syncs that are to occur between frame swaps. This must be done on the master synchronization card only. At step 606, the REALIZM_PRSNT field in the FRAME_CTRL register is initialized on all synchronization cards. At step 608, the SYNC_FRAME_EN bit in the FRAME_CTRL register on the master synchronization card is set. At step 610, the process is paused for the last FIFO request for a frame. Then, at step 612, the VSM_EXISTS bit (bit 2) of the GE_CONFIG register in all graphics engines is set high. At step 614, the IFF_GE_QUANTUM register in all graphics engines is set to a predetermined value. At step 616, a LoadRAMDAC command is sent to all graphics boards to again toggle the FRM_LOCK_EN and FRM_LOCK_REL bits from low to high to low. At step 618. an Interlock command is sent to all graphics boards. At step 620, the command sequence to cause all graphics boards to swap their graphics buffers is sent. At step 622, the INTLCKS_REL bit in the FRAME_CTRL register is monitored to determine when the frame swap occurred and when to begin sending the requests for the next frame. At step 624, the FRAME_TIME registers are monitored to determine if the desired frame rate was achieved. These last two steps are optional and are included to indicate how performance may be monitored by a software control program so that it may determine if the desired frame rate is being achieved.

If a synchronization card is determined to be not present at step 602, then the process continues to step 626 in which the process is paused until the last FIFO request for a frame is detected. Then, at step 627, the VSM_EXISTS bit (bit 2) in the GE_CONFIG register of the master graphics board is set high. Then, at step 628, the IFF_GE_QUANTUM register in the graphics engine on the master graphics board is set to a predetermined value. At step 630, an Interlock command is sent to all slave boards. At step 632, the buffer swap command sequence is sent to all slave graphics boards. At step 634, the process is paused until the INTLCK_H bit (bit 6) of the CSR is detected to be asserted high on all slave boards. Then, at step 636, a LoadRAMDAC command is sent to the master board. The LoadRAMDAC command should set high, then set low, (i.e., pulse) the FRM_SYNC_EN and FRM_SYNC_REL bits in the TEX_RGB EN register. Note that the TEX_RGB_EN register, in a preferred embodiment, is write only and also contains the TEX_RGB_EN_L bit. Therefore, the current state of the TEX_RGB_EN_L bit should be known and accounted for in this command. In a preferred embodiment, the status of the bit is tracked by the control software that is driving the multiple displays. In an alternate embodiment, the TEX_RGB_EN register, or portions thereof, may be mirrored to a readable location. The LoadRAMDAC command should also have the EMASK[7:0] defined such that it will wait on input FIFO quantum and vertical blank. When this command is executed by the graphics engine on the master graphics board, it will concurrently release all of the interlocks on the slave boards.

Then, at step 638, the commands necessary to cause the master graphics board to swap buffers are sent. This should be done immediately after the LoadRAMDAC command so that the frame swap on all systems occurs substantially simultaneously.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of synchronizing, at a system frame display rate, a first set of frames displayed by a first monitor with a second set of frames displayed by a second monitor, the first set of frames being produced by a first graphics engine at a first frame production rate, the second set of frames being produced by a second graphics engine at a second frame production rate, the method comprising the steps of:

A. comparing the first frame production rate and the second frame production rate to determine which frame production rate is slower; and B. setting the system frame display rate to a set display rate that is no greater than the slower of the first frame production rate and the second frame production rate.

2. The method as defined by claim 1 wherein each frame in the first set has a corresponding frame in the second set, the method further including the step of:

C. starting the pixelization of each frame on the first monitor at approximately the same time as the pixelization of each corresponding frame on the second monitor.

3. The method as defined by claim 2 wherein the each frame includes horizontal and vertical sync pulses having edges, step C comprising the step of:

C1. aligning the horizontal and vertical sync pulse edges of each frame in the first set with the respective horizontal and vertical sync pulse edges of each corresponding frame in the second set.

4. The method as defined by claim 1 further including the step of:

D. modifying the system frame display rate to an override rate, the override rate overriding the set display rate.

5. The method as defined by claim 4 further including the step of:

E. storing feedback data in memory for access by a graphics program, the feedback data being at least one of the first frame production rate and the second frame production rate.

6. The method as defined by claim 1 wherein the first graphics engine has a first front buffer and a first back buffer, the second graphics engine having a second front buffer and a second back buffer, the method further comprising the step of:

F. swapping the first front buffer and the first back buffer at a first time and swapping the second front buffer and the second back buffer at a second time, the first time and the second time being substantially the same time.

7. The method as defined by claim 6 wherein the first monitor and the second monitor are configured to have a substantially identical vertical blank period, the first front and back buffers being swapped at multiples of the vertical blank period.

8. The method as defined by claim 1 wherein the first and second graphics engine receive a clock signal from a single clock.

9. The method as defined by claim 1 further including the step of:

G. initializing the first and second graphics engines to have substantially identical horizontal and vertical refresh frequencies, and substantially identical vertical blank periods.

10. An apparatus for synchronizing, at a system frame display rate, a first set of frames displayed by a first monitor with a second set of frames displayed by a second monitor, the first set of frames being produced by a first graphics engine at a first frame production rate, the second set of frames being produced by a second graphics engine at a second frame production rate, the apparatus comprising:

a comparitor for comparing the first frame production rate and the second frame production rate to determine which frame production rate is slower; and means for setting the system frame display rate to a set display rate that is no greater than the slower of the first frame production rate and the second frame production rate.

11. The apparatus as defined by claim 10 wherein each frame in the first set has a corresponding frame in the second set, the apparatus further including:

means for starting the pixelization of each frame on the first monitor at approximately the same time as the pixelization of each corresponding frame on the second monitor.

12. The apparatus as defined by claim 11 wherein the each frame includes horizontal and vertical sync pulses having edges, the means for starting comprising:

means for aligning the horizontal and vertical sync pulse edges of the each frame in the first set with the respective horizontal and vertical sync pulse edges of each corresponding frame in the second set.

13. The apparatus as defined by claim 10 further including:

a modifier for modifying the system frame display rate to an override rate, the override rate overriding the set display rate.

14. The apparatus as defined by claim 13 further including:

means for storing feedback data in memory for access by a graphics program, the feedback data being at least one of the first frame production rate and the second frame production rate.

15. The apparatus as defined by claim 10 wherein the first graphics engine has a first front buffer and a first back buffer, the second graphics engine having a second front buffer and a second back buffer, the apparatus further comprising the step of:

a memory controller for swapping the first front buffer and the first back buffer at a first time and swapping the second front buffer and the second back buffer at a second time, the first time and the second time being substantially the same time.

16. The apparatus as defined by claim 15 wherein the first monitor and the second monitor are configured to have a substantially identical vertical blank period, the first front and back buffers being swapped at multiples of the vertical blank period.

17. The apparatus as defined by claim 10 wherein the first and second graphics engine receive a clock signal from a single clock.

18. The apparatus as defined by claim 10 further including:

means for initializing the first and second graphics engines to have substantially identical horizontal and vertical refresh frequencies, and substantially identical vertical blank periods.

19. A method of synchronizing, at a system frame display rate, a first set of frames displayed by a first monitor with a second set of corresponding frames displayed by a second monitor, the first set of frames being produced by a first graphics engine at a first frame production rate, the second set of frames being produced by a second graphics engine at a second frame production rate, the method comprising:

comparing the first frame production rate and the second frame production rate to determine which frame production rate is slower;

setting the system frame display rate to a set display rate that is no greater than the slower of the first frame production rate and the second frame production rate; and aligning the horizontal sync pulse edges of each frame in the first set with the respective horizontal sync pulse edges of each corresponding frame in the second set.

20. The method as defined by claim 1 wherein the first frame production rate is greater than a first minimum rate, the second frame production rate similarly being greater than a second minimum rate, the system frame display rate being set to be no greater than the smaller of the first and second minimum rates.

21. A method of synchronizing, at a system frame display rate, a first set of frames displayed by a first monitor with a second set of corresponding frames displayed by a second monitor, the first set of frames being produced by a first graphics engine at a first frame production rate, the second set of frames being produced by a second graphics engine at a second frame production rate, the method comprising:

determining the slower of the first frame production rate and the second frame production rate;

setting the system frame display rate to be no greater than the slower of the first frame production rate and the second frame production rate;

the first monitor displaying the first set of frames at the system frame display rate; and the second monitor displaying the second set of frames at the system frame display rate.

22. The method as defined by claim 21 further comprising:

aligning the horizontal sync pulse edges of each frame in the first set with the respective horizontal vertical sync pulse edges of each corresponding frame in the second set.

23. The method as defined by claim 21 wherein the first monitor and second monitor display corresponding frames in the first and second sets of frames.

24. The method as defined by claim 1 wherein each frame in the first set has a corresponding frame in the second set, the method further comprising:

aligning the vertical sync pulses of each frame in the first set with the respective vertical sync pulse edges of each corresponding frame in the second set.

* * * * *